(12) United States Patent
Navas Sabater et al.

(10) Patent No.: US 6,738,267 B1
(45) Date of Patent: May 18, 2004

(54) SWITCHED POWER SUPPLY CONVERTER WITH A PIEZOELECTRIC TRANSFORMER

(75) Inventors: Jose Andres Navas Sabater, Madrid (ES); Mercedes Rivas Saiz, Madrid (ES); Pedro Alou Cervera, Madrid (ES); Roberto Prieto Lopez, Madrid (ES); Javier Uceda Antolin, Madrid (ES); José Antonio Cobos Marquez, Madrid (ES)

(73) Assignee: Alcatel, Paris (FR)

( * ) Notice: Subject to any disclaimer, the term of this patent is extended or adjusted under 35 U.S.C. 154(b) by 17 days.

(21) Appl. No.: 10/111,049

(22) PCT Filed: Oct. 9, 2000

(86) PCT No.: PCT/EP00/10420

§ 371 (c)(1), (2), (4) Date: Jul. 19, 2002

(87) PCT Pub. No.: WO01/29957

PCT Pub. Date: Apr. 26, 2001

(30) Foreign Application Priority Data

Oct. 19, 1999 (ES) .............................................. 9902296

(51) Int. Cl.[7] .............................................. H02M 3/335
(52) U.S. Cl. .......................................... 363/17; 363/98
(58) Field of Search ............................... 363/15, 16, 17, 363/98, 132; 310/316, 318, 319

(56) References Cited

U.S. PATENT DOCUMENTS

| 3,708,701 A | | 1/1973 | Kawada | |
| 4,459,505 A | | 7/1984 | Lim | |
| 5,768,111 A | * | 6/1998 | Zaitsu | .......................... 363/15 |
| 5,923,542 A | * | 7/1999 | Sasaki et al. | .................. 363/16 |
| 6,535,407 B1 | * | 3/2003 | Zaitsu | ......................... 363/126 |

FOREIGN PATENT DOCUMENTS

EP  0 729 219 A2  8/1996

OTHER PUBLICATIONS

Zaitsu T et al.: "Piezoelectric Transformer Converter with Frequency Control", Proceedings of the International Telecommunications Conference (INTELEC), US, New York, IEEE, vol. CONF. 17, Oct. 29, 1995, pp. 175–180, XP000729660.

Patent Abstracts of Japan, vol. 1998, No. 11, Sep. 30, 1998 & JP 10 164848 A (Matsushita Electric Works LTD), Jun. 19, 1998.

* cited by examiner

*Primary Examiner*—Jessica Han
(74) *Attorney, Agent, or Firm*—Sughrue Mion, PLLC

(57) ABSTRACT

A piezoelectric transformer converts a first voltage, supplied from a voltage source, into a second, different, stabilized voltage by a DC/AC converter followed by a rectifier connected in cascade to a filter. The DC/AC converter block includes a driver block followed by the piezoelectric transformer, such that the driver block feeds the piezoelectric transformer with a pulse train (21) the frequency of which coincides with the switching frequency (F1) of switching elements included in the driver block. The switching frequency (F1) is less than a resonant frequency (FR) of the piezoelectric transformer; for example, the switching frequency is a sub-harmonic of the resonant frequency (FR).

7 Claims, 2 Drawing Sheets

SWITCHED POWER SUPPLY CONVERTER WITH A PIEZOELECTRIC TRANSFORMER

OBJECT OF THE INVENTION

The present invention relates to a switched power supply converter which employs as transformer a piezoelectric transformer to perform a process of converting a voltage supplied from a power source into a different output voltage, suitable for being applied to a load.

The galvanic isolation of the switched power supply converter is provided by the piezoelectric transformer, the operation of which is controlled by the switching of at least one switching element.

The switched power supply converter is of special application, but not exclusively, in telecommunications systems since it offers a high performance with reduced size and weight.

The piezoelectric transformer carries out the transformation of a is voltage applied across some primary terminals to a different voltage produced across some secondary terminals through the mechanical vibration of the piezoelectric transformer, using the piezoelectric effect.

STATE OF THE ART

A switched power supply converter with galvanic isolation is adapted for performing a conversion of an input voltage into an output voltage by means of the action of a transformer with windings, i.e., it is a magnetic element.

It is possible to incorporate the power supply converter into a conversion topology with galvanic isolation, which is provided by means of the electromagnetic transformer. Examples of this conversion topology are a forward converter with active clamp and a flyback converter. Both converters have the property of facilitating galvanic isolation, located in different position.

The transformer provides galvanic isolation between the input and the output of the power supply converter, and permits design of the power supply converter with various outputs, as well as compliance with the safety regulations.

However, for the power transformer to provide said properties it must fulfil some design requirements that determine its physical size and weight. Consequently, the power transformer within the switched power supply converter is one of the heaviest and bulkiest devices. Therefore it is necessary to reduce the volume of the power transformer in order to carry out an overall process of miniaturising the switched power supply converter, as well as achieving a reduction in the weight thereof.

The function of transforming the input voltage into a different output voltage may be implemented by a mechanical vibration of a piezoelectric transformer, the volume of which is noticeably less in size than that of the magnetic transformer for an equivalent power level.

Nonetheless, the use of the piezoelectric transformer is not generalised since it has the drawback that in order to work with a high efficiency, the switching elements that govern its operation must work at very high frequency, so that the switching losses increase significantly.

There exists a need to develop a switched power supply converter with galvanic isolation by means of a piezoelectric transformer. The power supply converter has switching elements for implementing the control of the piezoelectric transformer in a simple fashion, which assures the production of a constant and regulated output voltage with a high overall efficiency, a compact size and a reduced weight.

CHARACTERISATION OF THE INVENTION

To overcome the problems mentioned above a switched power supply converter is proposed which is reduced in size and weight, while having a high overall efficiency, making it suitable for being mounted together with telecommunications equipment.

It is therefore an object of the present invention to provide a power supply converter that includes a piezoelectric transformer so that its excitation is directed by a driver block the switching elements of which may be switched at a reduced frequency such that the switching losses are minimal.

The switched power supply converter converts a first voltage, supplied from a voltage source, into a second different stabilised voltage by means of a connection in cascade of a DC/AC converter block, followed by a second rectifier connected to a second filter.

The DC/AC converter block comprises a driver block followed by said piezoelectric transformer, connected in cascade. The driver block excites the piezoelectric transformer by means of a pulse train with a first frequency that is less than a resonant frequency of the piezoelectric transformer.

The first frequency corresponds to the frequency at which is switched at least one switching element that the driver block comprises. Then, the switching frequency is a subharmonic (sub-multiple) of the resonant frequency of the piezoelectric transformer.

BRIEF DESCRIPTION OF THE FIGURES

A more detailed explanation of the invention is given in the following description, based on the attached figures, in which.

DESCRIPTION OF THE INVENTION

Figure 1:
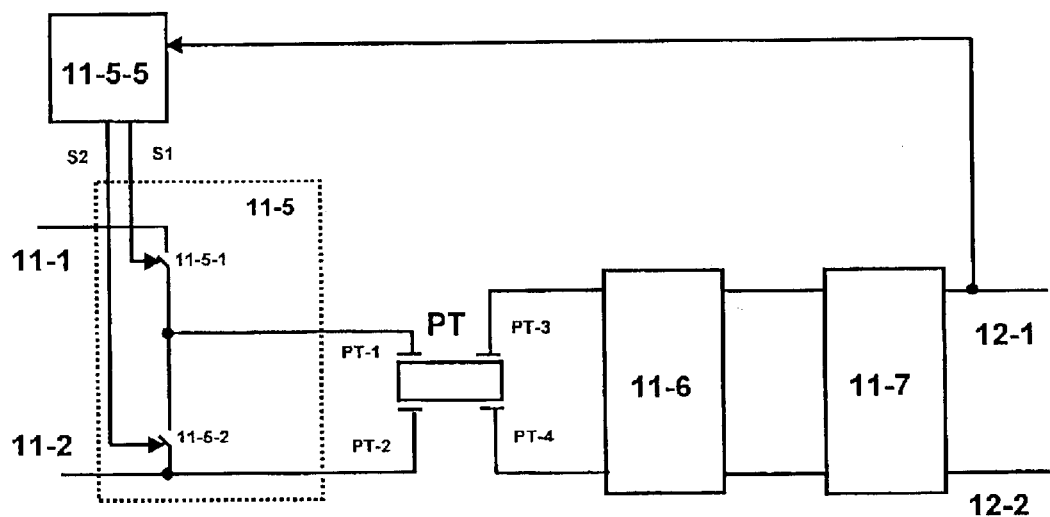
FIG. 1 shows in a block diagram a preferred embodiment of a switched power supply converter with a piezoelectric transformer according to the invention.

FIG. 1 represents a preferred embodiment of a switched power supply converter that has a piezoelectric transformer PT. The power supply converter performs the conversion of a first input voltage applied across some input terminals 11-1 and 11-2, to a second different voltage that is produced across some output terminals 12-1 and 12-2. The terminal 11-1, for example, is connected to the positive pole and the terminal 11-2 to ground, respectively.

A voltage source supplies the first input voltage. The voltage source can be a mains AC power supply distribution network, a DC voltage source, or others.

The switched power supply converter comprises, in a connection in cascade, a DC/AC converter block followed by a second rectifier 11-6 and thereafter a second filter 11-7, the output terminals of which coincide with the output terminals 12-1, 12-2 of the power supply converter.

The DC/AC converter block consists of a conversion topology such as one of the half-bridge type, for example, it being possible to employ other conversion topologies that provide galvanic isolation.

The DC/AC converter block has some input terminals that coincide with the terminals 11-1, 11-2; and it comprises a driver block 11-5 connected in cascade to the piezoelectric transformer PT. The driver block 11-5 comprises a series combination of a first switching element 11-5-1 and a second switching element 11-5-2. The series combination is connected across the terminals 11-1, 11-2.

It is possible for both the first switching element 11-5-1 and the second switching element 11-5-2 to be field effect transistors MOSFET, respectively.

Figure 2:
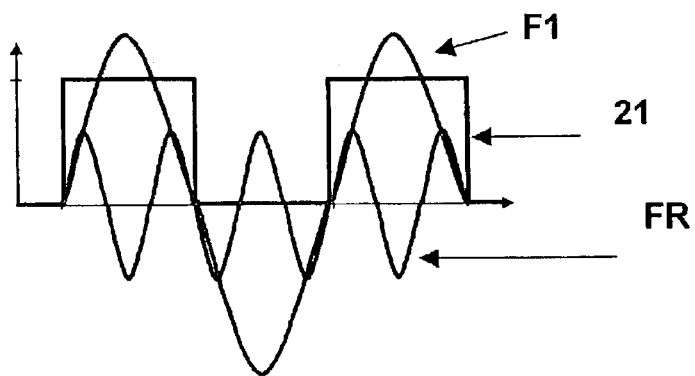
FIG. 2 shows some waveforms related with the control of some switching elements and of the piezoelectric transformer according to the invention.

With respect now to FIG. 2, the operation of the half-bridge type topology is known in the state of the art and, therefore, is not described in detail. Its operation is summarised in that when, for example, the first MOSFET 11-5-1 is in conduction (ON) there is a first voltage level applied across some terminals PT-1 and PT-2 of the piezoelectric transformer PT; the second MOSFET 11-5-2 is cut off (OFF).

After a time (duty cycle) fixed by a control device 11-5-5 such as a pulse width modulation (PWM) device, a pulse frequency modulation (PFM) device, or others, the first MOSFET 11-5-1 switches to the OFF state. After a time (duty cycle) fixed by the control circuit 11-5-5, the second MOSFET 11-5-2 shall come into conduction (ON) and there is a second voltage level applied across the terminals PT-1 and PT-2 of the piezoelectric transformer PT.

In brief, a pulse train 21 is applied across the terminals PT-1 and PT-2. The pulse train has a frequency, namely first frequency F1, which corresponds with the switching frequency of both MOSFETs 11-5-1, 11-5-2.

Returning now to FIG. 1, the DC/AC block performs the conversion of the first DC voltage to another different alternating voltage that is rectified in the second rectifier 11-6. Before this rectified voltage reaches the load, it is filtered in the second filter 11-7 to provide the stabilised DC voltage across the output terminals 12-1, 12-2, which corresponds to the second output voltage of the switched power supply converter.

It is possible for the second rectifier 11-6 to be, for example, a self-excited synchronous rectifier. And it is possible for the second filter 11-7 to be made up of an inductor and a second storage capacitor, for example.

Returning now to FIG. 2, the driver block 11-5 produces across its output terminals, which correspond with the terminals PT-1, PT-2 of the piezoelectric transformer PT, the pulse train 21 the waveform of which is of the square type, this being an alternating voltage. The piezoelectric transformer PT produces across some first output terminals PT-3 and PT-4 the alternating voltage, by means of its vibration in a thickness extensional mode, for example.

The physical design of the piezoelectric transformer PT is implemented so that it satisfies the requirements for power, voltage level, current level, or others, as required by the load from the switched power supply converter.

Therefore, the piezoelectric transformer PT has dimensions, a weight and a vibration mode, which are direct functions of the design parameters. Likewise, the galvanic isolation between the input and the output of the power supply converter is facilitated by the piezoelectric transformer PT.

The physical characteristics of the piezoelectric transformer PT determine a resonant frequency FR.

The driver block 11-5 organises and directs the transfer of energy that is carried out by the piezoelectric transformer PT between the input terminals PT-1, PT-2, and the output terminals PT-3, PT-4.

The driver block 11-5 excites or stimulates the vibratory movement in the transformer PT so that the latter vibrates at its resonant frequency FR, or as close to it as possible, since with said resonant frequency FR a high efficiency is achieved during the energy transfer process performed by the piezoelectric transformer PT.

The first frequency F1 of the pulse train 21 is less than the resonant frequency FR of the piezoelectric transformer PT, so that the first frequency F1 is a sub-harmonic (sub-multiple) of the resonant frequency FR. For example, if the first frequency F1 is equal to a third of the resonant frequency FR, it is termed third sub-harmonic; and so on successively.

In brief, the piezoelectric transformer PT is excited by means of the first frequency F1 (switching frequency), which coincides approximately with a predetermined sub-multiple of the resonant frequency FR, namely the fundamental frequency.

Returning to FIG. 1, the control circuit 11-5-5 produces at its output a first control signal S1 (that is, first duty cycle) and a second control signal S2 (that is, second duty cycle) as a function of a sample of the output voltage of the power supply converter, for the purpose of guiding the switching of both MOSFETs 11-5-1, 11-5-2. Consequently, the pulse train 21 produced by the driver block 11-5 is a function of the output voltage of the power supply converter.

The first control signal S1 is applied to a first control terminal (gate) of the first MOSFET 11-5-1 and the second control signal S2 is applied to a second control terminal (gate) of the second MOSFET 11-5-2, respectively.

As the switching frequency F1 of both MOSFETs 11-5-1, 11-5-2 is less than the resonant frequency FR of the transformer PT, the losses associated with the switching of the MOSFETs 11-5-1, 11-5-2 are small.

Consequently, the overall efficiency of the switched power supply converter is high, its size and weight are reduced, that is miniaturising of the power supply converter is achieved.

Figure 3:
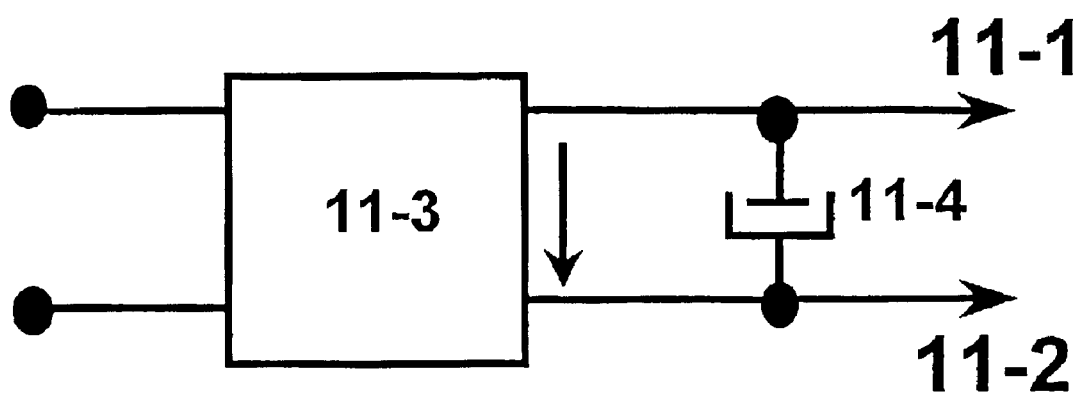
FIG. 3 shows a modification of the switched power supply converter according to the invention.

FIG. 3 represents another preferred embodiment of the switched power supply converter, this being connected to an AC source through a connection in cascade of a first rectifier 11-3 such as a full wave rectifier bridge, followed by a first filter which has a first storage capacitance 11-4 which is connected across the input terminals 11-1, 11-2 of the power supply converter.

The first input filtering storage capacitance 11-4 is necessary to provide the minimum ripple required in the first input voltage to the DC/AC converter block.

Moreover, it performs a storage of energy that it supplies to the DC/AC converter block in the event of any fault condition arising in the AC mains distribution network.

We claim:

1. Switched power supply converter with a piezoelectric transformer (PT) that converts a first voltage into a second different stabilised voltage by means of a connection in cascade of a DC/AC converter block, followed by a second rectifier (11-6) connected to a second filter (11-7), characterised in that said DC/AC converter block comprises, in a connection in cascade, a driver block (11-5) followed by said piezoelectric transformer (PT), so that said driver block (11-5) excites said piezoelectric transformer (PT) by means of a pulse train (21) with a first frequency (F1) which corresponds with a predetermined sub-multiple of a resonant frequency (FR) of said piezoelectric transformer (PT).

2. Switched power supply converter according to claim 1, characterised in that said first frequency (F1) corresponds with the third sub-multiple of said resonant frequency (FR).

3. Switched power supply converter according to claim 1, characterised in that said driver block (11-5) comprises a control device (11-5-5) that directs the production of said pulse train (21) as a function of a sample of said second voltage.

4. Switched power supply converter according to claim 3, characterised in that said control device (11-5-5) produces as many switching control signals (S1, S2) as there are switching elements (11-5-1, 11-5-2) comprised in said driver block (11-5).

5. Switched power supply converter according to claim 4, characterised in that said control device (11-5-5) is a pulse width modulation (PWM) device.

6. Switched power supply converter according to claim 4 characterised in that said control device (11-5-5) is a pulse frequency modulation (PFM) device.

7. Switched power supply converter according to claim 1, characterised in that said DC/AC converter block is implemented according to a conversion topology of the half-bridge type.

\* \* \* \* \*